J. Miller,
Harvester Rake.

No. 66609.   Patented July 9 1867

Witnesses.   Jacob Miller.
By atty A.B. Stoughton

JACOB MILLER, OF CANTON, OHIO.

*Letters Patent No. 66,609, dated July 9, 1867.*

---

IMPROVEMENT IN HARVESTER-RAKES.

---

The Schedule referred to in these Letters Patent and making part of the same.

---

TO ALL WHOM IT MAY CONCERN:

Be it known that I, JACOB MILLER, of Canton, in the county of Stark, and State of Ohio, have invented certain new and useful improvements in Raking Attachments for Harvesters; and I do hereby declare the following to be a full, clear, and exact description of the construction and operation of the same, reference being had to the accompanying drawings, making a part of this specification, in which—

Similar letters of reference where they occur in the separate figures denote like parts of the machine in both of the drawings.

This invention consists, first, in the arrangement of a fork, attached to an arm or sweep-rod that slides in a swivel-post placed on the main frame, and driven from the main wheels for giving said fork or rake its proper motion in connection with a cam path or track on the platform. It further consists in a post or tang, placed on the driving-arm for the purpose of guarding the end of the teeth, and of assisting the fork or rake in moving the grain off the grain-table or platform.

To enable others to make and use my invention, I will proceed to describe the same with reference to the drawings.

Figure 1:
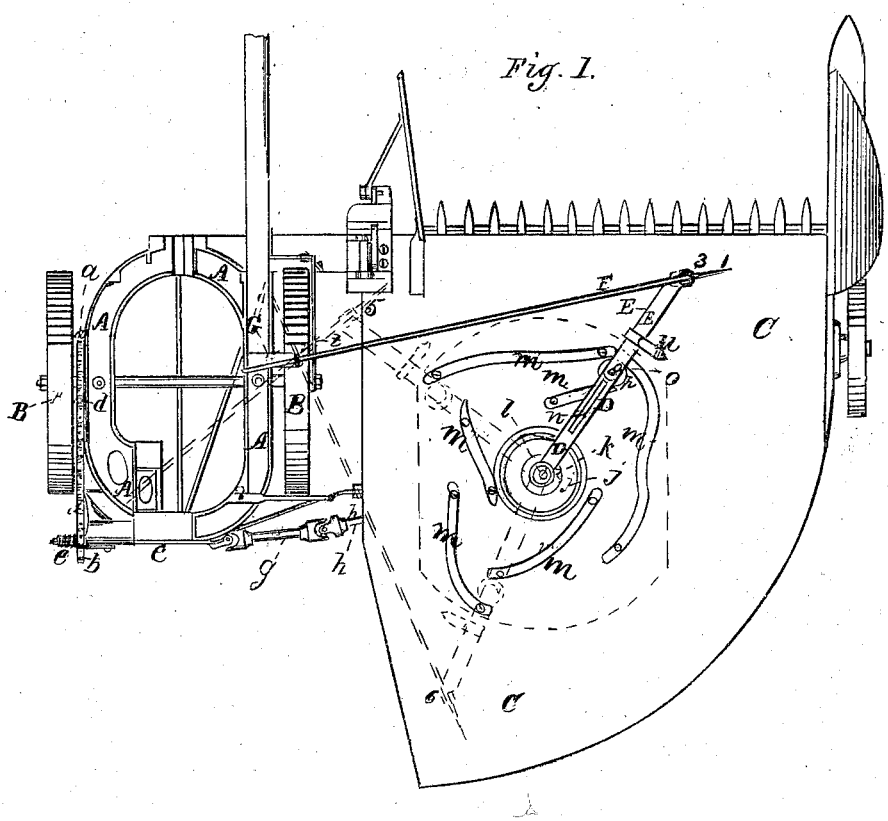
Figure 1 represents a top plan of a harvesting machine with the raking attachment applied thereto, the shield or secondary platform being removed to show the parts underneath it.
Figure 2:
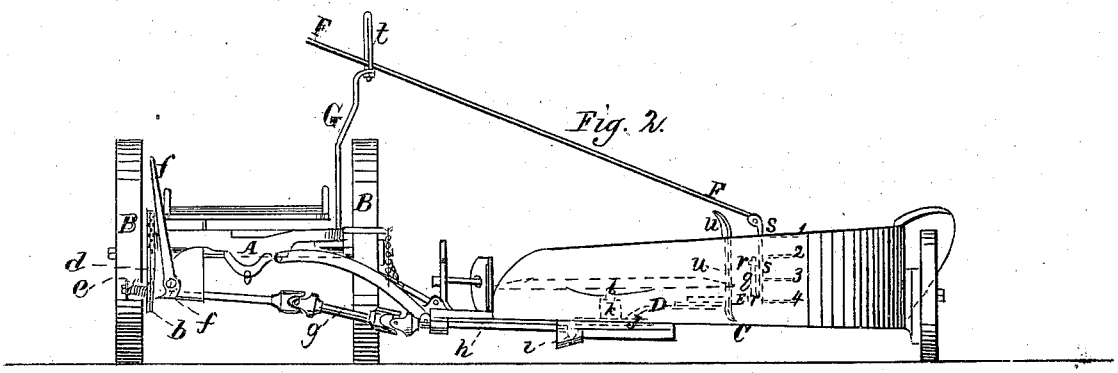
Figure 2 represents a rear elevation of the machine.

The frame A is made of cast iron by preference, and supported on the two wheels B B, one or both of which may be driving-wheels. Connected to the driving-wheel there is a sprocket-wheel, $a$, around which, and around a smaller sprocket, $b$, on the shaft $c$, passes an endless driving-chain, $d$. The small sprocket $b$ is held in clutch with its shaft $c$ by a spring, $e$, and when it is desired to stop the action of the rake whilst the machine continues to advance, a lever, $f$, is forced against said wheel $b$, and moving it away from its clutch, it will turn on the shaft instead of turning the shaft, and the rake, of course, ceases to move. The shaft $c$ is connected through a toggle-jointed link, $g$, to a shaft, $h$, underneath the platform C; and on the end of this shaft $h$ there is a bevel pinion, $i$, that works in a bevel-gear on the under side of a disk, $j$, whose hub $k$ sets over a rigid pin or journal, $l$, extending up through and above the platform far enough to form a permanent and rigid support for the supplemental grain-table, shown in red lines in the figures, which covers the cam path or ledges $m$ on the main platform C. There is connected to the disk $j$ an arm, D, which of course revolves with said disk; and this arm is slotted, as at $n$, so that a pin, $o$, passing through another arm, E, lying and working on top of the arm D, and through said slot, may move in it, as it in turn is moved by a friction-roller, $p$, on its lower end, taking against the cam ways or ledges $m$ on the platform C. To a post, $q$, on the end of the upper arm E, is pivoted, by lugs $r\ r$, the rake or fork head $s$, which carries the teeth 1 2 3, which are stationary in the head, and a lower one, 4, which is hinged in the said head so that it may move closely to the platform, and then rise up to pass over the arm E, which it does just previous to entering the grain to remove it from the platform. To the top of the rake or fork head $s$ there is pivoted a sweep-rod, F, the interior end of which passes through a swivel-head, $t$, on top of a post, G, set on the main frame A of the machine. This swivel-head accommodates itself to the varied positions of the sweep-rod as it is carried around at its outer end by the fork, and also aids to steady the fork in its movements. The positions of the arm, fork, and sweep-rod are shown by red lines in fig. 1 when the fork is at those points. The position at 5 shows the fork just ready to enter the grain preparatory to sweeping it off from the platform. The black lines show the relative positions of the several parts when at that point; and at 6 they are again shown in their relative positions in red lines, and in the act of delivering the gavel from the platform on to the ground. On the arm D, at its extreme outer end, there is a post or tang, $u$, which serves as a guard for the teeth of the fork or rake, and also aids in delivering or moving the grain off from the platform, it having a foot, $v$, that moves close to the platform. The secondary or auxiliary grain-table, shown in red, protects the roller on the driving-arm, as also the cam ledges, from being choked or stopped by the falling grain, and also serves to hold up the falling grain in part, so that the fork may more readily take it.

Having thus fully described my invention, what I claim as new, and desire to secure by Letters Patent, is—

First, the combination of swivel-post, the sweep-rod, fork, and driving-arm with the cam ledges, for giving said fork its projecting and retreating motions in connection with its revolving motion, substantially as described.

I also claim, in combination with the fork, the post or tang on the driving-arm, for guarding the end of the teeth of the fork, and for aiding in moving the grain from the platform, substantially as described.

JACOB MILLER.

Witnesses:
DANL. TONNER,
JOHN TONNER.